Figure 1:
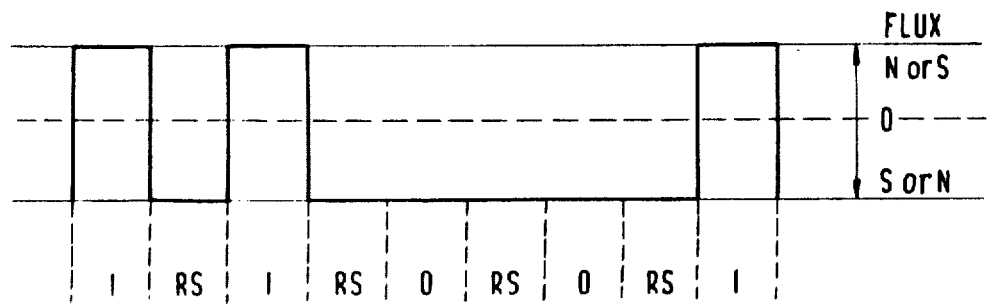

United States Patent [19]

Steynor et al.

[11] 4,297,729
[45] Oct. 27, 1981

[54] ENCODING AND DECODING OF DIGITAL RECORDINGS

[75] Inventors: James H. Steynor, High Wycombe; Frederick Hayes, Southall, both of England

[73] Assignee: EMI Limited, Hayes, England

[21] Appl. No.: 961,933

[22] Filed: Nov. 20, 1978

[30] Foreign Application Priority Data

Nov. 24, 1977 [GB] United Kingdom ............ 48917/77

[51] Int. Cl.³ .............................................. G11B 5/09
[52] U.S. Cl. ......................................... 360/40; 360/51
[58] Field of Search ....................... 360/40, 41, 47, 51, 360/43, 44

[56] References Cited

U.S. PATENT DOCUMENTS

| 3,646,534 | 2/1972 | Miller | 360/40 |
| 3,715,738 | 2/1973 | Kleist et al. | 360/40 |
| 3,736,581 | 5/1973 | Breikss | 360/43 |
| 3,761,903 | 9/1973 | Bird Jr. et al. | 360/47 |
| 3,859,510 | 1/1975 | Fiehmann et al. | 360/43 |
| 3,974,523 | 8/1976 | Miller et al. | 360/40 |
| 4,012,786 | 3/1977 | McKie et al. | 360/43 |
| 4,024,379 | 5/1977 | Pfost et al. | 360/40 |
| 4,027,152 | 5/1977 | Brown et al. | 360/39 |
| 4,167,760 | 9/1979 | Decker | 360/40 |

FOREIGN PATENT DOCUMENTS 994188 9/1961 United Kingdom .
1025450 4/1963 United Kingdom .

Primary Examiner—Vincent P. Canney
Attorney, Agent, or Firm—Fleit & Jacobson

[57] ABSTRACT

In television games programs may be stored on tape, disc or similar to change a basic games unit to different games or other entertainment or instruction. The data is transferred from the recording medium to a processor and clocked in at a suitable rate. The invention provides generation of clock pulses using two counters. The arrangement generates clock pulses at a predetermined position of data 1's but for 0's it generates clock pulses a predetermined interval after the preceding pulse. An arrangement is provided recording staggered data on two tracks of a tape to counter drop outs and a watermark code is provided to guard against use of unauthorized programs.

11 Claims, 11 Drawing Figures

ENCODING AND DECODING OF DIGITAL RECORDINGS

The present invention is applicable to digital recordings.

It is particularly, though not exclusively, related to the use of digital recording for use for Television Games.

For television games, the game programs may be stored as data in a Compact Cassette or on a disc or similar. This has the advantage over the more usual ROM (read only memory) store of having a greatly increased data capacity. Furthermore, the recording can include audio information if desired.

In the making of such recordings, the data is usually stored in parallel format (e.g. on punched paper tape) and is encoded on to the recording medium in a serial format—or on to a copy master tape for subsequent duplication on to, say, cassettes. On playing back the recording on a suitable playing mechanism incorporated in the TV games unit, the data is usually converted back into parallel format for feeding into the games processor unit.

Throughout the encoding and decoding processes the data transfer is activated by "clock" oscillator pulses which are required to be maintained in synchronism with the data bit rate.

Several problems arise in the process referred to. In particular wow, flutter and long term speed drift are caused during the duplicating process and when replaying on an inexpensive playing mechanism such would be supplied with the game, and these vary the output data rate to which the "clock" has to be synchronised.

It is an object of this invention to provide an arrangement for synchronisation in the presence of such variations to reduce the consequent problems.

According to the invention there is provided an arrangement for generating controlled clock pulses synchronised to a signal comprising a sequence of '0's and '1's, the arrangement including a first counter receiving the said signal and arranged to count for a first predetermined period from a predetermined point in relation to each '1' of the said signal and to provide a controlled clock pulse synchronised to said signal at the termination of the first period, a second counter arranged to count for a second and longer predetermined period from the preceding controlled clock pulse or until reset prior to the termination of said period and, if not reset, to provide at the termination of said second period a further controlled clock pulse and means for resetting the second counter on reception of a further '1' at the first counter.

According to another aspect of the invention there is provided a method of generating controlled clock pulses synchronised to a signal comprising a sequence of '0's and '1's including the steps of generating a controlled clock pulse at the termination of a first period from a predetermined point in relation to each '1' of said signal and generating a further controlled clock pulse at the termination of a second, longer, period from a preceding controlled clock pulse if a pulse is not generated in response to a '1' within the second period.

Figure 2:
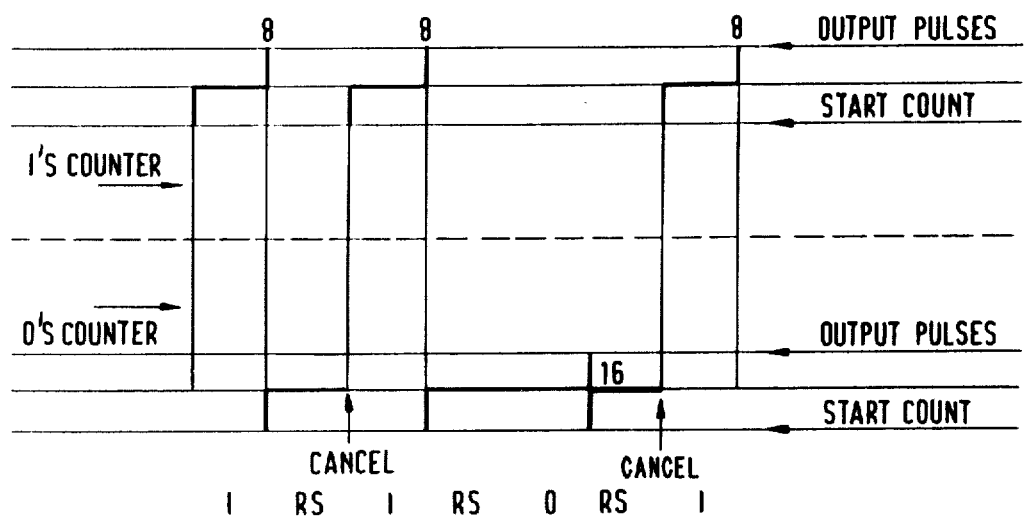
Figure 3:
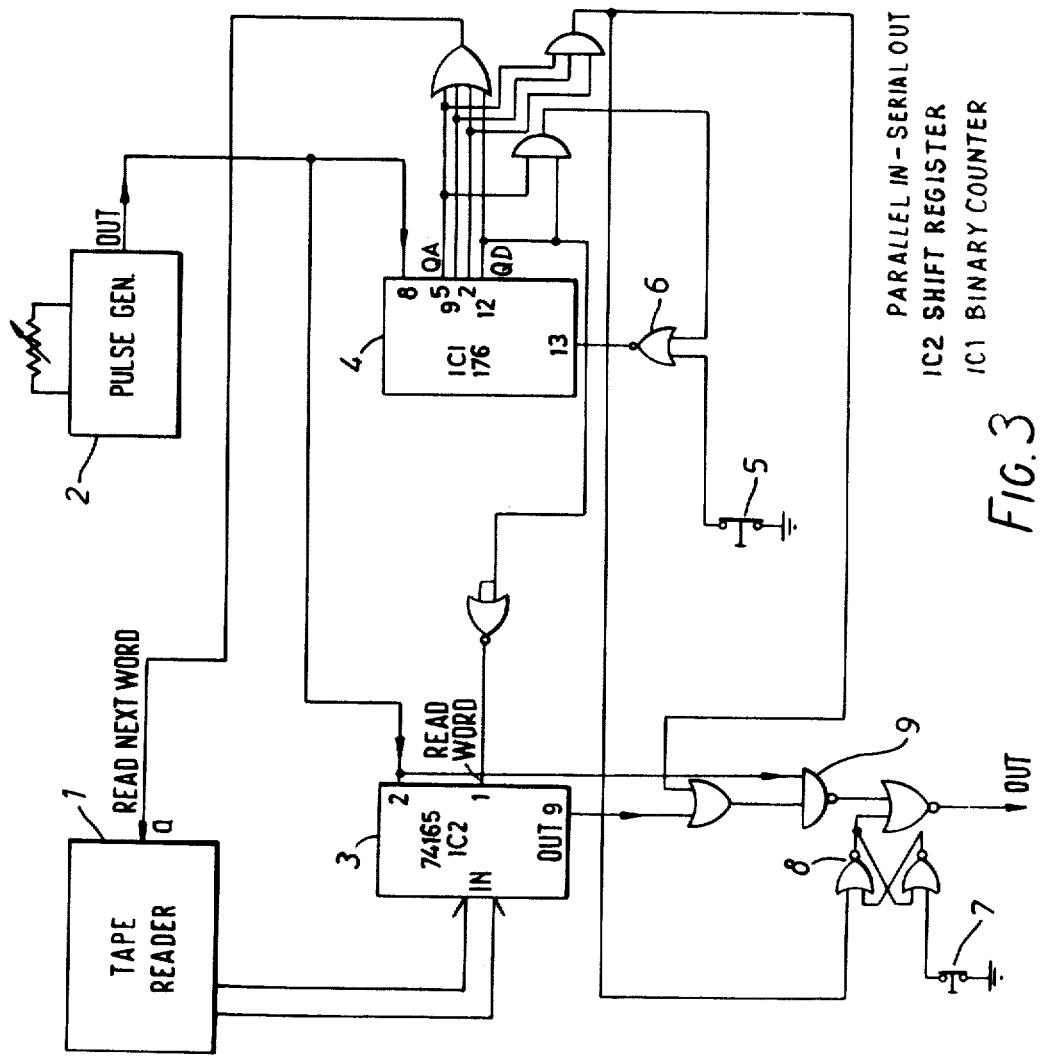
Figure 4:
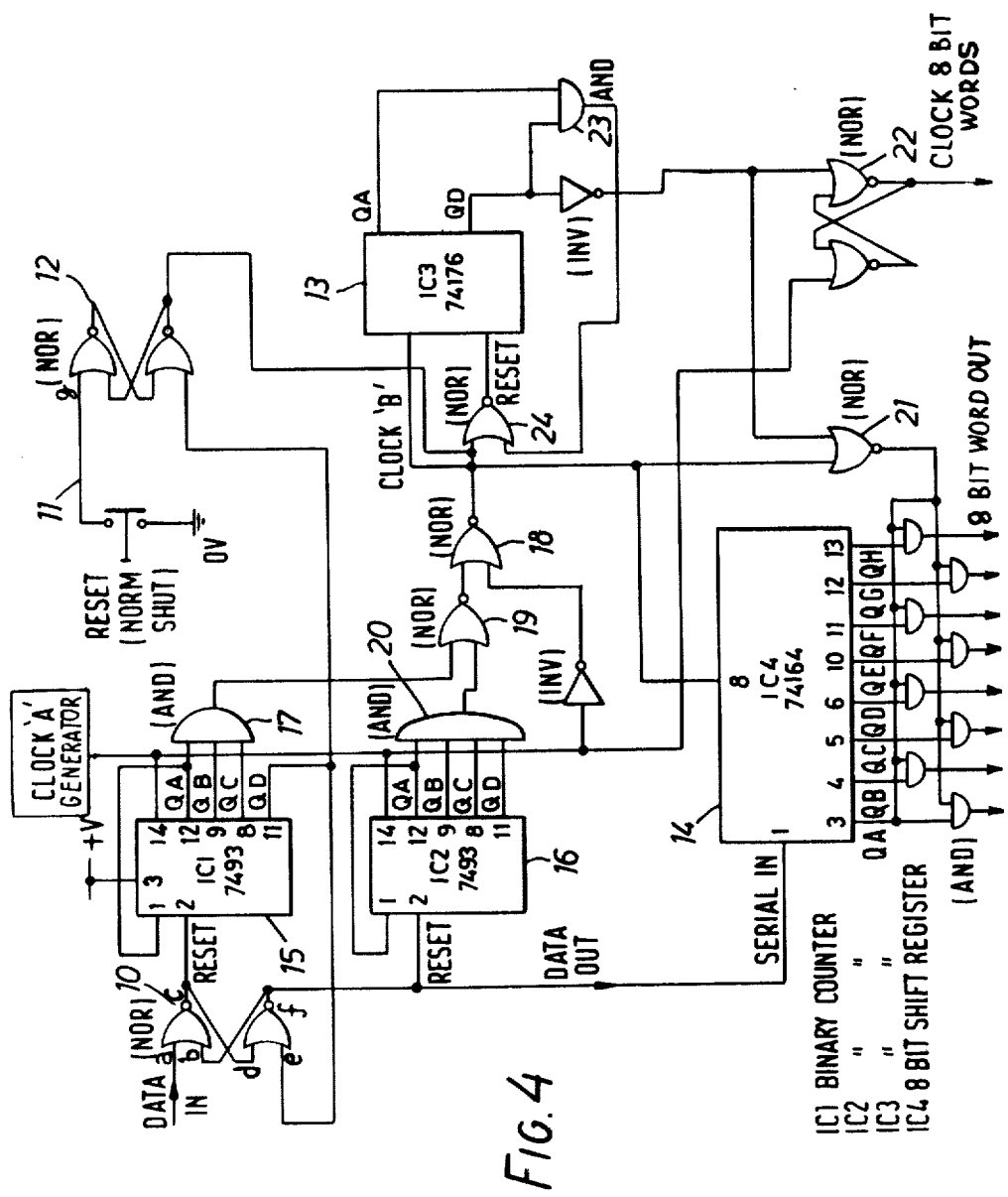
Figure 5:
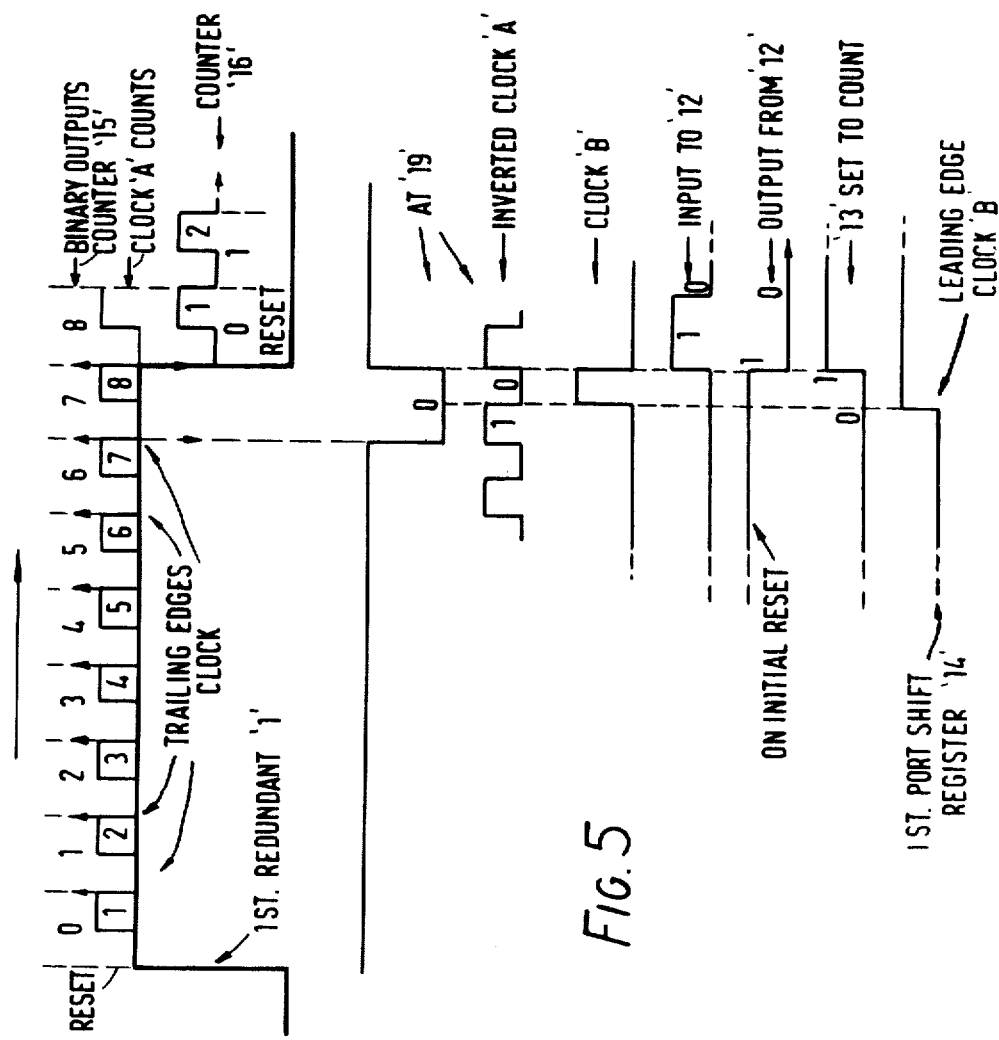
Figure 6:
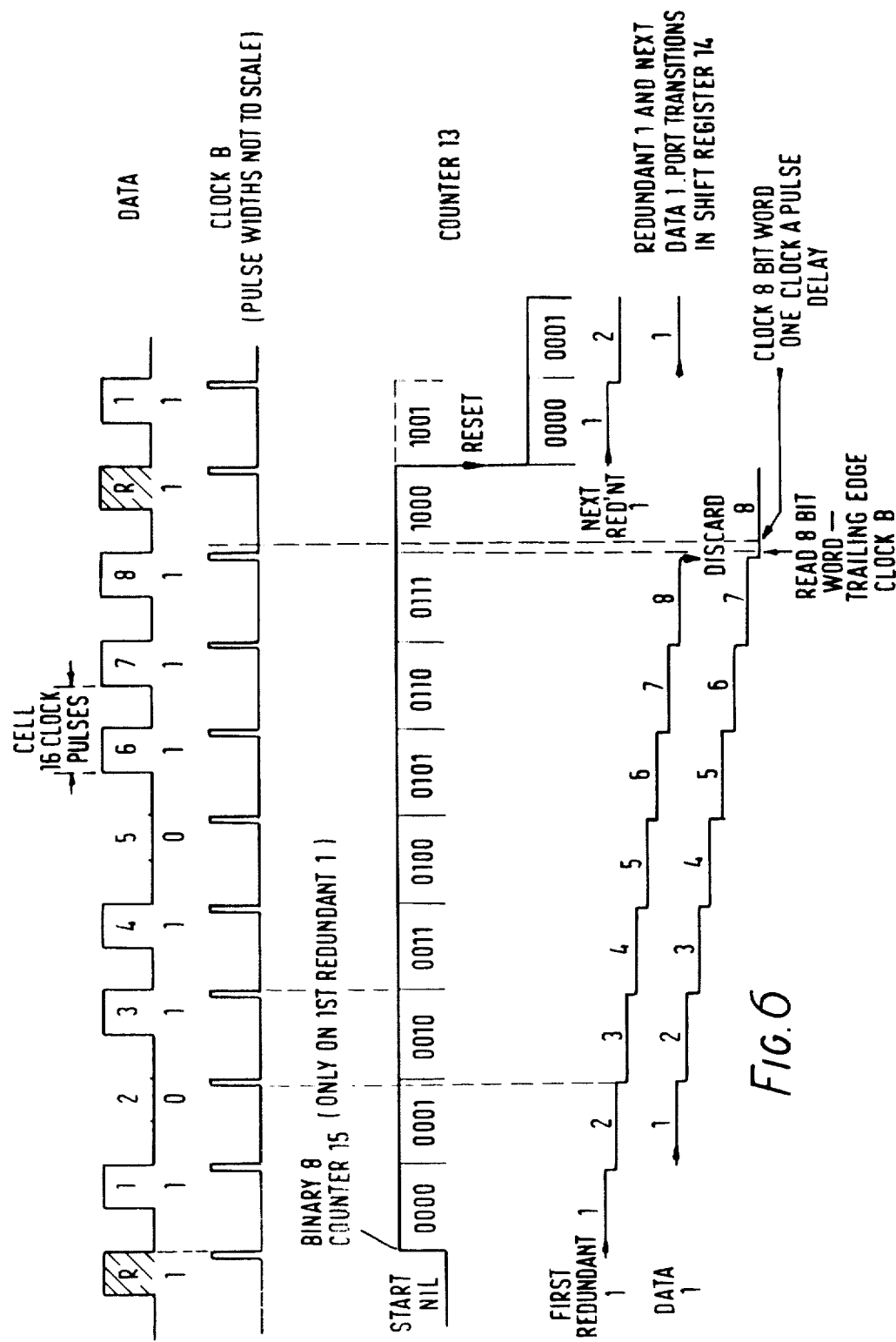
Figure 7:
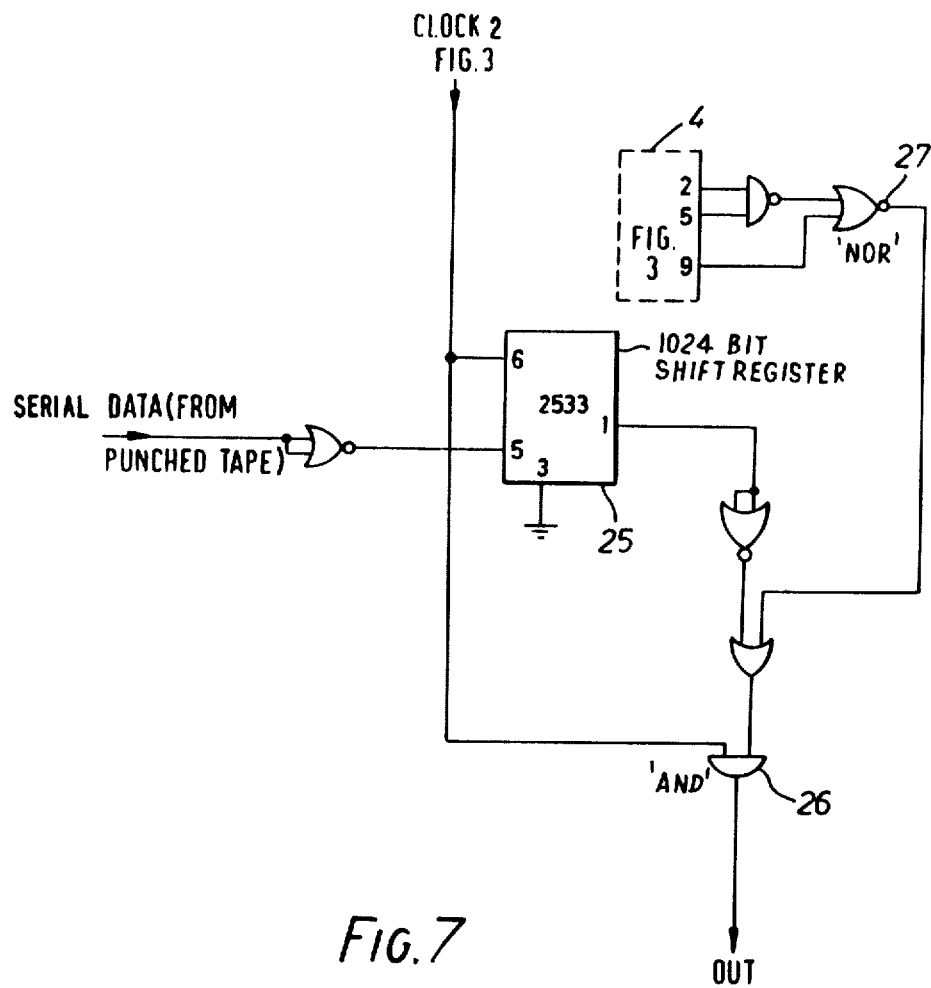
Figure 8:
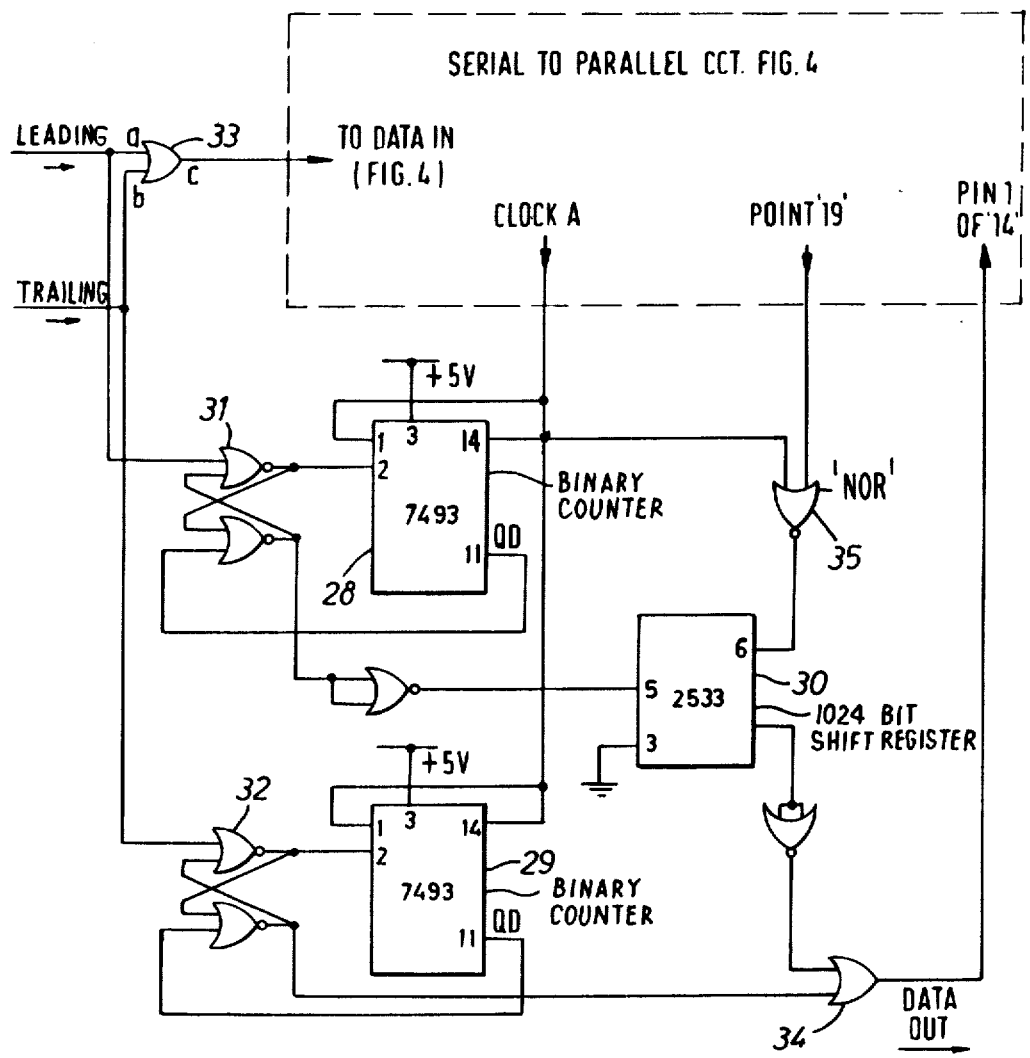
Figure 9:
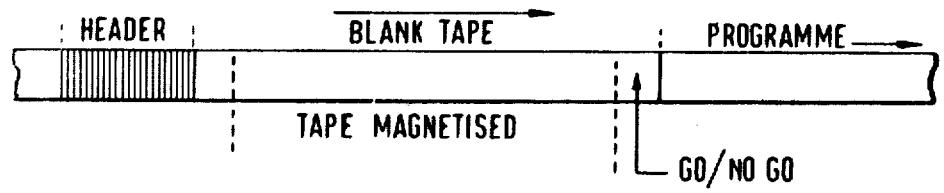
Figure 10:
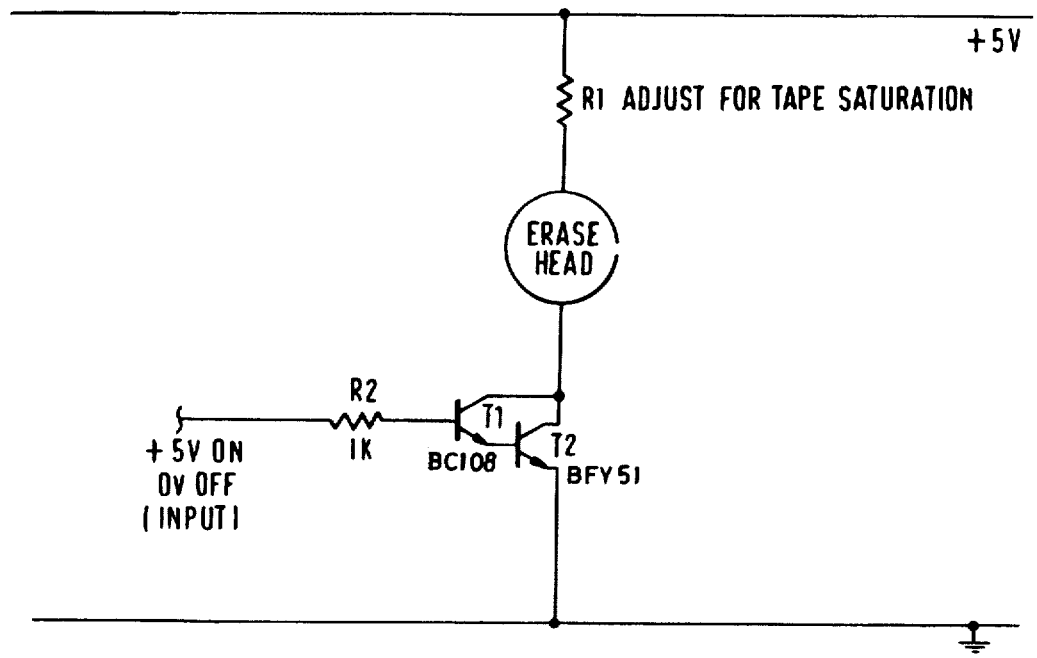
Figure 11:
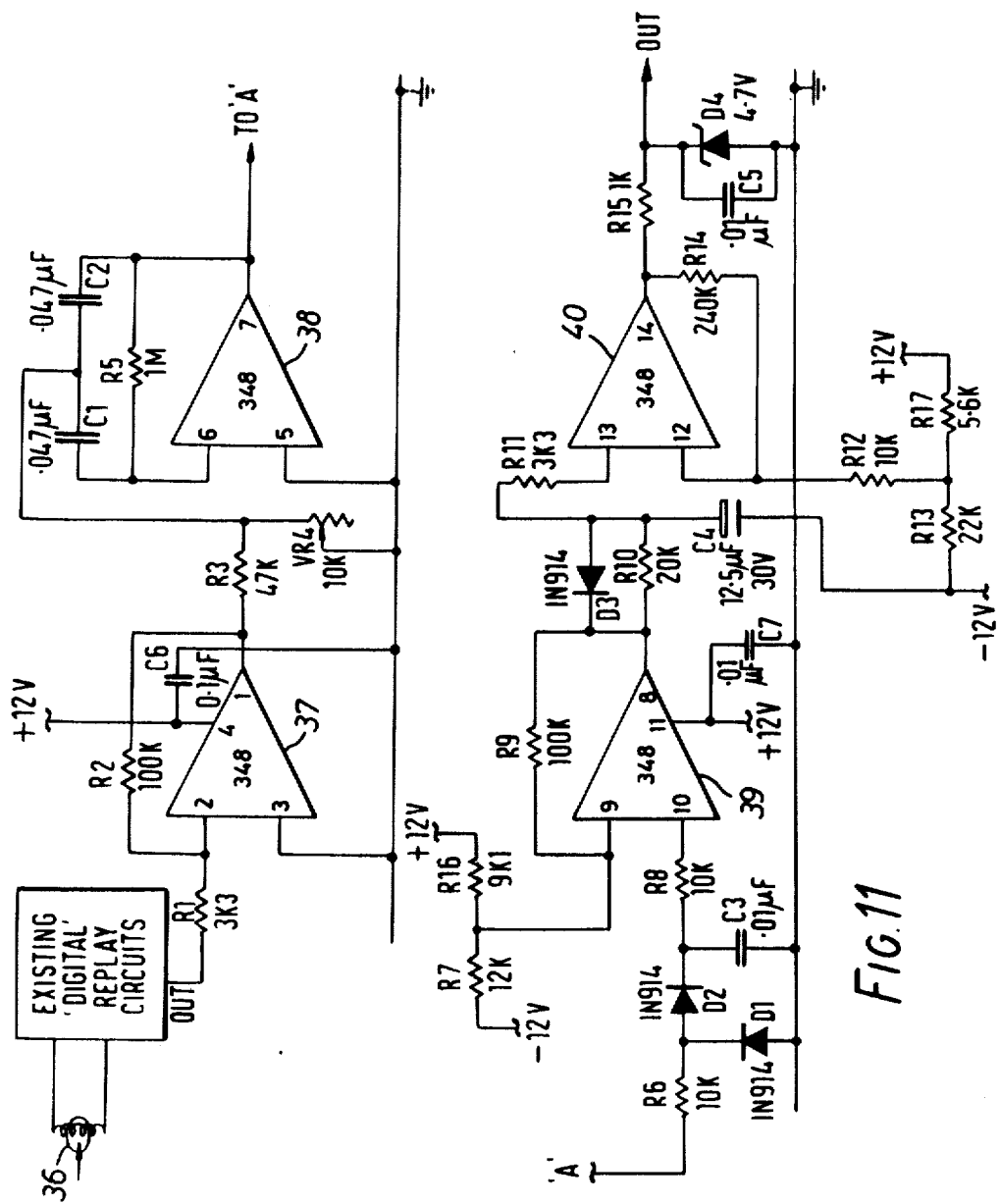

In order that the invention may be clearly understood and readily carried into effect, examples thereof will now be described with reference to the accompanying drawings, of which:

FIG. 1 relates to the Biased Discrete Pulse recording technique,
FIG. 2 illustrates a pulse sequence of the invention,
FIG. 3 shows a parallel to serial conversion circuit used when recording game programs,
FIG. 4 shows a suitable digital replay serial to parallel converter,
FIG. 5 is a diagram to illustrate pulse switching edges,
FIG. 6 is a pulse diagram for the serial to parallel conversion,
FIG. 7 shows a staggered data recording circuit,
FIG. 8 is a staggered data replay circuit,
FIG. 9 shows a coded region of a typical tape,
FIG. 10 shows a magnetisation circuit, and
FIG. 11 shows a typical code detection circuit.

For storage of games programs there are several problems to be taken into account. Loss of bit data can occur due to defects in the recording medium and produce undesirable "drop-outs" resulting in loss of vital information. Furthermore, illegal copying of data programs may occur. Thus protection to ensure that a fraudulent copy may be readily detected is desirable. However, this invention is primarily concerned with the problems resulting from the need to increase insensitivity to wow, flutter and long-term speed drift and those will be first described. The objective is to ensure that a game circuit activating clock pulse ("window") occurs for every 1 or 0 bit in the data in a circuit tending to be resistant to data timing errors due to playback speed variations. A recording technique is selected in which pulse lengths of 1 or 0's are equal and where blank "reset" periods of similar length occur after each bit. In a working example (as shown in FIG. 1) the technique known as Biased Discrete Pulse Recording is adopted.

In the replay system, the locking of the clock pulses into synchronism occurs only on 1's in the data when the recording is replayed into the game. Therefore, to guard against an excessive sequence of 0's in the data, where no synchronism can occur, redundant 1's are recorded between each eight bit parallel word when transferred from the punched paper tape into serial format by means of shift register logic elements.

In the games circuit, a high speed master clock is provided which generates pulses at a rate which is a multiple of the data bit rate during replay at exact speed. Thus, in this example, a multiple of sixteen has been chosen. Since the bit rate in this example is 1665 pulses/s the master clock rate is 26640 pulses/s. This results in the duration of data 1's and 0's each being equal to the duration of eight master clock pulses and the total duration of a data reset period (1 cell) being equal to sixteen master clock pulses. Output clock pulses to activate the games logic can then be derived in synchronism with the recorded data by systems based on counting master clock pulses to these unit cell lengths.

In this example, there are provided two logic counters with BCD outputs. When activated they are driven by the master clock which generates pulses at sixteen times the data bit rate.

In operation, the arrival of the replay differentiated leading edge of a '1' in the data activates the first counter (via bi-stable logic elements). For the purpose of this example, the leading edge of the data will be used as a reference. Other parts of the waveform, such as the crossover of the differentiated signal, may on a negative flux change also be used. On count eight a master clock pulse arrives at the output of a three input AND gate connected to the appropriate outputs of the counter. Thus a pulse is generated in synchronism with the trailing edge of the data '1'.

On the following master clock pulse the counter is reset (by taking the appropriate counter output via the switching bistable elements). At the same time, the second counter is activated and will count to sixteen if not reset by the first counter, i.e. if the next element is a '0'. At the output of a four input AND gate connected to the appropriate outputs of this counter, a master clock pulse is generated. This pulse marks the end position of a '0' in the tape data.

However, if '1's' arrive from the recorded data, the first counter operates as described. It resets the second counter after count 8 thereby cancelling the count of the second counter.

Thus marker pulses for '1's' and '0's' are generated where synchronism is controlled by the trailing edges of the 'data' '1' pulses (centre of data cell).

Such clocking from the centre of the data cell may be chosen in order to achieve maximum immunity from data speed variations. The sequence is illustrated in FIG. 2.

During the operation of the counters as described, the recorded data '0's' and '1's' are fed into an eight bit shift register where shift occurs on each generated marker pulse which is routed to the register by appropriate logic circuits. By means of a further counter, the register is discharged into the game processor in parallel on completion of each eight bit word, together with the game activating pulse. The redundant '1's' which were recorded between each eight bit word are discarded by the limited capacity of the eight bit shift register.

Loss of the data due to drop-outs will now be considered. Drop-outs in tapes are found to occur mainly from tape defects not exceeding a spread of around 0.1" in the tape surface, and they are generally remotely situated along the tape length. Loss of digital information=digital packing dentity×length of defect along the tape, which for a packing density of 888 bits/inch and linear defect of 0.1"=approx. 90 bits loss.

To eliminate such losses, it is proposed that the bit data be recorded on two separate tracks. The data on one track is delayed by a time period to produce staggering of information between the two tracks by a tape length exceeding 0.1". On replay, the situation is reversed; that is, the undelayed recorded track is delayed so that information from the two tracks is co-incident. The output information from both tracks is added. By this means, information which would be lost due to drop-outs on one track is preserved by the output from the other track.

The required information staggering may be achieved mechanically by the use of twin track heads with staggered gaps or by two separate heads with their gaps precisely set apart to produce the required delay in one track.

It would be difficult to achieve, by mechanical means, the uniformity in precision of gap staggering required on all equipment to be used with staggered information tapes.

It is considered preferable to achieve the delay by electronic means using, for example, shift registers. Such devices are available as integrated circuit chips to accommodate up to 1024 bits where the delay of 888 bits/inch would operate over 1.15 inch of tape length, for a tape speed of 1.875"/s.

With this facility, standard forms of twin track head may be used for the record and replay modes where vertical alignment of the two gaps may be readily achieved.

Suitable circuits for implementing the invention will now be described. These are given as examples only, since alternative circuits, operating according to the principle of the invention, may readily be devised by those skilled in the art.

The examples given are also described in terms of magnetic tape recording systems, in particular by cassette tapes. It should be understood, however, that they can be readily adapted for use with other recording media, such as disc recordings.

FIG. 3 shows a parallel to serial conversion circuit suitable for use with TV games. The data program will normally be provided initially on punched paper tape in parallel format. The program will be of any type suitable to control TV games either of known type or games which may, at a later time, be devised. The actual nature of this program does not form any part of this invention which is concerned only with the recording and reproduction of the program. The system of FIG. 3 converts the parallel data to serial form for recording on magnetic tape and includes redundant 1's at the beginning of the program and between every sequence of eight bit words as discussed hereinbefore.

The circuit includes a punched paper tape reader 1 of conventional form for tapes having eight bit parallel words. It is arranged so that a shift from one word to the next occurs when the input at 'a' changes from high to low level (to 0). A drive pulse generator 2 has a repetition frequency set to produce the desired bit density on the magnetic tape to which the program is being transferred. For a tape moving at 1⅞ inches per second, the frequency is 1665 per second for a bit density of 888 per inch. A parallel in, serial out shift register 3 loads the input, to read eight bit words, when pin 1 goes to low level (0). Serial data then appears at pin 9 on every positive going clock pulse. A counter 4 counts the clock pulses. The binary output of counter 4 changes during the trailing edges of positive going clock pulses. Reset to '0' occurs with a low (0) input on pin 13. 'AND' gate connections are provided so that reset occurs on the positive edge of binary count 9.

In operation, the tape reader 1 is set on the leader tape preceding the punched data. A reset switch 5 is opened to produce a '0' reset and hold on the counter 4 since it has '1' and '0' as the inputs of a NOR gate 6 feeding pin 13. A further reset switch 7 is momentarily pressed to produce a '1' on the output of a flip-flop 8. At this point the magnetic tape recorder, which is to receive the circuit output, is started and reset switch 5 is closed to start the clock count on counter 4. When the binary count reaches '7' the output of flip-flop 8 switches to '0' and opens the output gate (which remains open until 8 is manually reset). This allows a clock pulse gated in NAND gate 9, by the output of the 3-input gate of counter 4, to pass to the output. This is a redundant '1' to precede the data program. Further redundant '1's' may be recorded until the first data is read from the punched paper tape. On the leading edge of binary count '9' a '0' appears at the reset input of counter 4 which then resets '0'. At the same time a '0' appears at the input 'a' of the tape reader which then shifts to the next word position. It will be assumed that there is a punched word at that position. Counting proceeds to binary count '7' when a further redundant '1' is fed to the data output.

On the next binary count '8' a '0' is fed to shift register 3 which then transfers the word into that shift register. Simultaneously, the first data bit from the current loading appears at the data output. On binary count '9' the counter 4 resets and the reader 1 shifts to the next word, as before. The second data bit still in the shift register 3 is fed out followed by the remaining six bits on subsequent clock counts.

As before, a redundant '1' follows when the counter 4 has recirculated to binary count '7' and the sequence repeats until all of the data has been serialised. The mark space ratio of all output data is maintained at 1/1 by summing with the clock pulses at a Nand gate 9.

Having stored the data on the magnetic tape in serial form, it must then be read into the games device, as described before and converted from serial data to parallel data for the games.

FIG. 4 shows a suitable circuit to accept the sequence of '1' and '0' bits from the tape replay data and to discharge each sequence of eight bits simultaneously (i.e. as words) into the games processor and for the processor to receive an activating clock pulse on reception of each word.

The circuit also generates the clock timing pulses which are concurrent with the tape replay bit rate irrespective of possible variations due to tape transport speed errors. The clock timing pulses in this function are required to activate the primary functions.

A NOR gate bi-stable element 10 (SR flip-flop) accepts the tape replay data and directs the output states for operation of subsequent parts of the circuit.

Logic '1' data bits arrive at the input as square waves from the gating circuit at TTL level (5v). For the purpose of this description, they are considered to occupy the first half of the bit cell length. Redundant '1' bits, which were inserted during the tape recordings, are similar and occur before each sequence of eight bit words.

Logic '0' data bits arrive at zero level and are signified by the absence of a pulse within the bit cell lengths.

From these definitions, it is seen that the time period for each data bit equals eight clock A pulses within a total cell period equalling sixteen clock A pulses. Before the arrival of tape data at flip-flop 10, the inputs a and b are at '0' level and the output states are '1' at c and '0' at f. A manually operated reset switch 11 is connected to a NOR gate 12 which in turn controls the resetting of a counter 13 before starting. It also activates the counter 13 on reception of a redundant '1' (or '1's') which precede the data replay.

The counter 13 is arranged as a nine bit binary counter which controls the output of eight bit words from a shift register 14 and the output of activating clock pulses for the games processor. '0' on the input resets the counter. '1' starts the count. Each count is registered on the trailing edge of each clock input pulse. Before starting the tape replay, the reset switch connected to flip-flop 12 is opened momentarily to set the input g high. This results in a '0' reset (via the NOR gate) at the input of counter 13 which is thus rendered inoperative.

The first pulse to arrive at the data input from the tape replay is a redundant '1'. It is useful to consider the sequence of events for a redundant '1' followed by data bits. The leading edge of the '1' on the input of flip-flop 10 sets c to '0' and f to '1'. Flip-flop 10 feeds the data to 16 bit pulse counters 15 and 16 which have binary outputs. They are arranged to count pulses from the master clock 'A' which has a pulse rate 16 times the nominal data rate (26640 and 1665 p.r.f. respectively). Clock 'B' output pulses in sync with the tape data are thereby derived. These counters are reset by a '1' (high) on the input and commence count on '0' (low) on the input. Counts are registered on the trailing edges of the clock pulses. Counter 15 starts to count clock 'A' pulses. On count '8' (binary '7'—outputs QA, B and C high) a '1' appears at the output of an AND gate 17 on these outputs. This syncs with an inverted clock 'A' pulse at the inputs of a NOR gate 18 which then outputs a '1'. Thus a clock 'B' pulse is produced in which the trailing edge is coincident with the trailing edge of the tape input redundant '1'. At this stage, the only outlet for the pulse is at the clock input of shift register 14 where shift and acceptance of data input occurs at the leading edge transition of the pulse. Since output f of flip-flop 10 has been set to '1', this state is entered into the first port of the shift register 14 during the clock transition. Flip-flop 10 maintains the duration of the tape output pulses until re-set occurs. This ensures that the pulses are not lost before entry into the shift register 14. Meanwhile, counter 15 continues to count clock 'A' pulses. On the next count '9' (binary '8'—output QD HIGH) two changes occur.

Firstly: Flip-flop 10 is reset to c=1, f=0.

Secondly: SR flip-flop 12 is set to '0' on the output, resulting in '1' (start) on counter 13.

These states enable counter 16 to count clock 'A' pulses, while counter 15 is re-set, and enable counter 13 to count clock 'B' pulses (which in the latter continues throughout the tape replay). These sequences are illustrated in FIG. 5.

It will be assumed that the tape data bit following the redundant '1' is a '0'. Since no pulse occurs in the bit cell, counter 16 continues to count. A count '16' (Binary '15', outputs QA, B,C,D, high) a '1' appears at the output of AND gate 20 at the output C which results, as with the redundant '1', in a pulse at the output of the NOR gate 18. This pulse is sixteen clock 'A' pulse periods behind the trailing edge of the previous '1' pulse from the tape replay. It therefore provides the clock 'B' pulse for the data '0'. On the next clock 'A' pulse, counter 16 repeats the count to produce further clock 'B' pulses if the tape data continues to be '0's'.

However, the arrival of the leading edge of a data '1' from the tape replay re-sets the flip-flop 10. This re-sets and stops counter 16 at approximately count '8' and starts the count on counter 15 to produce a clock 'B' pulse at the trailing edge of the data pulse as described above for the redundant '1' pulse.

By these means, clock 'B' pulses are derived to mark the trailing edges of tape data '1's'+'0's' occurring at the nominal centres of the bit cells. Timing corrections, allowing for tape speed drift, can occur only in the '1's'. It is for this reason that redundant '1's' are inserted into the tape recording at the beginning and after every eighth bit to avoid loss of sync during an excessive sequence of '0's' in the data. Where the data is all '0's' the maximum permissible timing variation may be shown to be + or −'7' on '128' clock 'A' pulses between the redundant '1's'= + −5.4%. Tape transport mechanisms, including cassette recorders, would normally be found to maintain tape speeds well below this magnitude of error.

There will now be discussed the events which occur on arrival of clock 'B' pulses at the output of the NOR gate 18.

On starting the tape replay, the first clock 'B' pulse is derived from a redundant '1'. This arrives before counter 13 has been set to count (on binary '8'—counter 15).

Therefore, this clock 'B' pulse is not counted by counter 13. However, it is directed to shift register 14. Register 14 is an 8 bit shift register which receives the serial data and feeds it in parallel form to the games processor. Data shift on the output ports and data input acceptance occurs only on the leading edge transition of the timing clock 'B' pulses. Register 14 allows the redundant '1' input state to be entered into the first port. This sequence occurs only during the processing of the first redundant '1'. It primes the count/register shift phases for elimination of all redundant '1's' from the data.

Immediately after generation of the first clock 'B' pulse, the counter 15 shifts to count '9' (binary '8' output) on counting the following clock 'A' pulse (as described hereinbefore). The input state on shift register 14 changes from '1' to '0' but the '1' already loaded into port 1 remains, since shift changes occur only during the leading transitions of clock 'B' pulses. The clock 'B' pulse counter 13 is also set to count, and the shift register 14 is ready to accept data '1's' or '0's' on the leading transitions of further clock 'B' pulses.

Count of clock 'B' pulses and register shift proceed to binary count '7' when ports QA to QG of shift register 14 are loaded with data and port QH is loaded with the redundant '1'.

On the next clock 'B' count, the redundant '1' is discarded from port QH leaving the register loaded with an eight bit data word. This occurs at the leading edge of the clock 'B' pulse.

On the trailing edge of the same clock 'B' pulse (which has the width of a single clock 'A' pulse) a '1' appears on output 'QD' of counter 13 (binary count '8'). This is inverted to '0' and taken to one input of a NOR gate 21 where it syncs with a '0' on the other input occurring also on the trailing edge of clock 'B'. The '1' which then appears on the output of NOR gate 21 goes to one each of the inputs the eight AND gates connected to the output ports of shift register 14. All ports loaded with '1' data, therefore, produce '1' on the outputs of their associated AND gates.

The inverted '1' from counter 13 is also taken to one input of NOR gate SR flip-flop 22 where the opposing input is connected to clock 'A'. On the next pulse to be received from clock 'A', the output 'flips to '1' which is the clocking pulse required to activate the games processor into accepting the eight bit word.

The sequential delays described hereinbefore ensure reliability in the transfer of information from one stage to the other.

The eight bit word has now been discharged into the games processor. On the trailing edge of the following clock 'B' pulse, the output of counter 13 changes to binary '9' (1's at QA+QD) and immediately re-sets to count via AND gate 23 and a NOR gate 24 which already has '0' on the opposite input. It is to be noted that this does not produce spurious pulses at the outputs of NOR gate 21 or of SR flip-flop 22 since the transition occurs when clock 'A' and 'B' outputs are low between pulses. In the meantime, the next redundant '1' has entered the first port of shift register 14. This occurred on the leading edge of the clock 'B' pulse.

Acceptance of further data into the shift register and discharge as 8 bit words, with elimination of redundant '1's' continues until all data has been transferred to the games processor. The pulse diagram shown in FIG. 6 exemplifies the process.

Further reference will now be made to the twin track staggered data system.

The system is designed to eliminate loss of tape data due to defects in a tape which may occur remotely in the tape length. It is only applicable to that form of recording since drop-outs do not result from disc cutting. A twin-track recording and replay system is used. The recorded data information is the same in both tracks, but the data in one track lags the data in the other track by a predetermined number of data bits and, hence, tape length.

On replay, the output obtained from the leading track is delayed by the same number of data bits to produce a combined output with the data from each track in the same phase. By this process a discrete defect across the tape width will not result in loss of data, since the loss in each track is recovered by its complementary track.

Staggering of record/replay gaps or heads can be used for producing the required data lag. Purely electronic means are preferred. The system will be described with use of shift registers having 1024 bits storage capacity. For recordings at 1⅜ inches the staggering separation of tracks by 1024 bits at a bit density of 888/inch is 1.153 inches resulting in a delay of 615 mulliseconds.

Considering now the recording circuit for the delayed track shown in FIG. 7 (which should be studied in conjunction with the parallel to serial conversion circuit of FIG. 3).

There is provided a 1024 bit capacity shift register 25 which is driven by pulses from the 1665 p.r.f. clock shown in FIG. 3. A data bit state accepted at the input appears at the output after 1024 clock pulses delay. Data is entered on clock logic '1'. It shifts when the clock goes to '0'.

At 4 there is shown the same pulse counter 4 as shown in FIG. 3.

In operation, the data in the delayed track is delayed by 1024 bits by the shift register 25. Recording in both tracks consists of a series of groups containing redundant '1' followed by eight data bits—each a total of nine possible pulses. The nearest multiple of nine to 1024 is 1026. The bit number positions in each group in the delayed track will therefore be 2 bits ahead of the delayed track.

The circuit is therefore designed so that the redundant '1's' which are added at the output of the circuit to the delayed track are also inserted two bits ahead in the required positions to precede each eight bit data group.

The starting sequence is the same as described for FIG. 3.

On binary count '5', '1's' appear at pins 2 and 5 of counter 4 which results, via the following gates, in a '1' synchronising with a clock pulse at the inputs of an AND gate 26. A redundant '1' is fed to the output. This redundant '1' is therefore 2 counts ahead of the redundant '1' for the undelayed/recorded track, as required.

On binary count 7, '1's' also appear at pins 2 and 5 of the counter 4 which are not required for the delay circuit. These are inhibited at the input of the following NOR gate 27, by the '1' from pin 9, which also appears on count '7'.

The process then continues, as described for the parallel to serial conversion circuit of FIG. 3, with data being delayed by 1024 bits. Redundant '1's are recorded on each binary count '5' during the initial delay period and subsequently with the delayed data. On replay, this track will be undelayed. Redundant 1's are therefore required ahead of data on this track to start the replay circuit.

FIG. 8 shows a replay circuit for delaying the leading recorded track.

In the replay mode the undelayed recorded track has to be delayed in order to restore the outputs from the two tracks to an identical data and phase relationship.

The circuit of FIG. 8 should be studied in conjunction with the serial to parallel conversion circuit of FIG. 4.

The binary counters 28 and 29 of the same type as 15 and 16 in FIG. 4 being arranged to operate as does counter 15 but with delayed data applied to one and undelayed to the other. They are arranged to count clock 'A' pulses up to binary '8' and then reset.

At 30 there is a 1024 bit shift register similar to 25 in the record circuit of FIG. 7.

At 31 and 32 there are SR flip-flops controlled by incoming data.

In operation this circuit operates as an inserted addition to the serial to parallel conversion circuit of FIG. 4. The leading and trailing gated tape data are branched to inputs 'a' and 'b' of an 'OR' gate 33. The output of that gate then goes to the data input of the circuit of FIG. 4. Clock 'B' pulses are thus generated from the data as described for FIG. 4.

At this stage the output data from the two tracks are not identical but they are in the same phase required for generation of clock pulses. The two bit 'staggering' of redundant '1's in the tape tracks is, in effect, an advantage towards maintaining sync. during sequences of data '0's'. Clock synchronism, which is vital, will also be maintained where drop-out effects occur in either of the tracks. Such a contributory factor to reliability is not obtainable in alternative systems of sequential staggering of data on single track recordings.

The leading and trailing gated data are also fed into the circuit of FIG. 8, as shown, where they operate on the SR flip-flops 31 or 32.

As described for the circuit of FIG. 4, where a similar input arrangement is used, the arrival of data '1's' on the inputs of the flip-flops start the counters. At the same time logic '1's' appear at the opposite outputs of the flip-flops which remain until the counters reset on binary '8'.

In the trailing data circuit the logic '1's' are taken to one input of the following OR gate 34. In the leading data circuit the logic '1's' are taken to the input of the 1024 bit shift register 30.

Progress of data through the 1024 bit shift register 30 is controlled by clock pulses taken from the output of 19 of FIG. 4. As shown in the pulse diagram (FIG. 5) an inverted pulse at '0' level occurs at this point with the duration of one clock A space-mark period extending over binary output '7'. This pulse is directed to one input of the NOR gate 35 connected to the clock input of the shift register 30. The other input of the gate 35 is connected to the non-inverted clock 'A' output. As will be seen from the pulse diagram of FIG. 5, logic '0' from the clock A occurs during the first half of the logic '0' pulse from 19. This result in a logic '1' clock pulse applied to the shift register during binary count '7'. The timing of the leading and trailing edges at the pulse is correct for acceptance and shift of data so that the data output from the shift register 30 is identical and in phase with the trailing data.

The trailing data and delayed leading data are taken via the OR gate 34 to the data input of shift register 14 (FIG. 4) where acceptance, shift and output is controlled by the clock 'B' pulses being timed by data input as described hereinbefore. Thus data missing from one tape track is recovered from the other track at the input of the OR gate 34.

It should be noted that only logic '1' data is transmitted through the circuit since data '0's' are signified by the absence of tape pulses within the timing periods of clock 'B'.

Considering now illegal copying of tapes, such as cassette tapes: cassettes intended for the recording of games programs may be loaded with tape having an in-built coding pattern, for example as described in British Patent No. 1,529,566.

Clearly, this protection is not applicable to the use of discs, but for games using tapes it is proposed to incorporate into the playing unit a simple code detection unit.

The code is a structural pattern (frequency tone) within the tape coating which cannot be erased. It also cannot be copied. To detect the code the tape is D.C. magnetized and a filter operating in the frequency range of the signal extracts the code. (The code is extracted from the D.C. modulation noise of the tape).

A pirated program cassette without the 'watermark' tape will not operate in the 'games' unit. The copy will be detected and the loading of the program halted.

After starting the transport a header code recorded on the tape preceding the program is identified. This code is so designed that without its 'identification' the program will not load into the 'games' unit. This header is arranged to precede a defined length of blank tape which is to be D.C. magnetized under control of the 'games' unit.

During the magnetization cycle, the replay signal is directed through a bandpass filter tuned to the code frequency. The output signal is adapted to control a GO/NO-GO function on the games unit depending on the presence or absence of a code.

To unidirectionally magnetize the tape, a direct current of sufficient level to saturate the tape is passed through the erase head fitted on the playback unit. The timing and duration of this magnetizing pulse is controlled by the games unit.

The data format at the start of a program cycle may be as shown in FIG. 9 viz:

Header—2 bytes of 8 bit words.

Blank section—2" (1.07 seconds at 1.875 in/s).

The following sequence occurs at the start of a program:

(a) With the cassette loaded and running, the header is identified by the games processor.

(b) D.C. current is switched to the erase head.

(c) The tape is replayed to identify the presence of a code.

(d) An output from replay to games unit—indicates GO/NO-GO.

(e) The direct current is terminated after preset time.

The code signal which is recorded on the track, is amplified by the existing analogue data replay circuit.

The signal is then passed through a bandpass filter (for example 741 type OP AMP). The output is rectified (hald wave), smoothed and used to switch on a logic element by the presence of a coded tape. The erase head has to be capable of accepting a suitable current to fully saturate the magnetic tape coating. On removal of the current the remaining magnetic field (remanence) should be insufficient to affect (by erasing) data on the cassette. All code detection (on-off D.C. field etc.) is controlled by the 'games' processing unit.

At the start of replay of a games cassette, the header code (eight bit words), which precedes the games program activates the games process to switch +5 v TTL level to the input of a Darlington pair (T1,T2 as shown in the circuit of FIG. 10).

Direct current passes through the erase head which generates a field of sufficient intensity to magnetize the tape coating to saturation. The timing of the processor output is arranged so that only the blank length of tape is magnetized.

A circuit for detection of the code is shown in FIG. 11. The magnetized tape passes over the replay head gap of head 36. The code signal thus produced within the modulation noise from a coded tape at the output of the head is amplified through the existing analogue amplifier of the games unit.

It is amplified further to produce a total gain of approximately 60 dB in the first amplifier 37 (quad op-amp 348) shown in FIG. 11. The signal is then passed through 38 arranged as a bandpass filter centred on the code signal frequency. VR4 provides tuning adjustment for the code frequency which is normally 80 Hz.

The extracted signal is then half wave rectified through section 39. The D.C. output charges C4 via the 20K ohm resistor. The time constant of 0.25s slows the charging rate to avoid signals from noise transients. Diode D3 ensures a rapid discharge at termination of signal.

40 is a Schmitt trigger which gives an output voltage restricted to 4.7 v by the Zener diode D4 during playback of the code signal. This voltage operates through the games processor to enable the acceptance of data into the game circuits.

The use of coded tape in games cassettes can possess security advantages, even where detection units are not fitted. Illegal copies can be identified by the absence of coding on the tape when subjected to test on the decoder instrument.

It will be appreciated that other variations of the invention may be devised by those skilled in the art. For example, it is applicable to data systems other than TV games system to which reference has been made.

Codes of sequences of data 1's and 0's may be encoded by the watermark principle. This can be obtained by the presence of a burst of code frequency for a '1' and the absence for a '0' or by use of multiple frequency systems.

In this way, a games unit can be arranged to play only tapes bearing a specific code sequence.

What we claim is:

1. An arrangement for generating controlled clock pulses synchronized to a signal comprising a sequence of '1's, each indicated by the presence of a signal pulse and '0's each indicated by the absence of a signal pulse, so that in a sequence of consecutive '0's no signal pulses are present, the arrangement including a first counter receiving the said signal and arranged to count for a first predetermined period from a predetermined point in relation to each '1' of said signal and to provide a controlled clock pulse synchronized to said signal at the termination of the first period, a second counter arranged to count for a second and longer predetermined period from a preceding controlled clock pulse or until reset prior to the termination of said period and, if not reset, to provide at the termination of said second period a further controlled clock pulse and means for resetting the second counter on reception of a further '1' at the first counter.

2. An arrangement according to claim 1 including a generator of master clock pulses, the first and second predetermined periods being determined by respective predetermined counts of the master clock pulses.

3. An arrangement according to claim 2 in which the master clock pulses are generated at a rate which is a multiple of the expected bit rate of said signal.

4. An arrangement according to claim 3 in which the master clock pulse rate is sixteen times the expected bit rate of said signal.

5. An arrangement according to claim 1 in which the controlled clock pulses provided in response to '1's' of said signal are arranged to have trailing edges coinciding with the trailing edge of the respective '1'.

6. An arrangement according to claim 1 in which the said predetermined point is the leading edge of said '1'.

7. An arrangement according to claim 1 in which the said predetermined point is the cross-over of the differentiated leading edge of said '1'.

8. An arrangement according to claim 1 in which the second counter is reset by the first counter on receipt of a '1' thereby.

9. An arrangement according to claim 1 in which the signal is provided as data coded by a biassed discrete code in which '1's' and '0's' representing data are separated by further '0's'.

10. A system for replaying recorded data and operating in the said data in response to controlled clock pulses, including an arrangement according to any one of claims 1-9 arranged to generate the controlled clock pulses.

11. A television game system including a replay system according to claim 10.

* * * * *